(12) United States Patent
Muta

(10) Patent No.: US 8,656,889 B2
(45) Date of Patent: Feb. 25, 2014

(54) CONTROL APPARATUS FOR A VEHICLE HAVING A PRIME MOVER

(75) Inventor: Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 626 days.

(21) Appl. No.: 13/000,932

(22) PCT Filed: Jun. 25, 2009

(86) PCT No.: PCT/JP2009/061584
§ 371 (c)(1),
(2), (4) Date: Dec. 22, 2010

(87) PCT Pub. No.: WO2010/150376
PCT Pub. Date: Dec. 29, 2010

(65) Prior Publication Data
US 2011/0118954 A1    May 19, 2011

(51) Int. Cl.
*F02D 41/00*    (2006.01)
(52) U.S. Cl.
USPC .............. 123/339.22; 123/41.05; 123/339.17; 123/179.4; 62/133; 62/323.1
(58) Field of Classification Search
USPC .................. 123/41.05, 339.1, 339.16, 339.17, 123/339.18, 339.22, 339.24, 179.1, 179.4; 701/112, 113; 62/133, 323.1, 323.2
See application file for complete search history.

(56) References Cited

U.S. PATENT DOCUMENTS

| | | | | |
|---|---|---|---|---|
| 5,623,903 A | * | 4/1997 | Ueda | 123/339.23 |
| 5,797,367 A | * | 8/1998 | Iida et al. | 123/295 |
| 5,934,089 A | | 8/1999 | Nakagawa et al. | |
| 6,032,869 A | * | 3/2000 | Ito et al. | 237/12.3 B |
| 7,317,985 B2 | * | 1/2008 | Suzuki | 701/113 |
| 7,415,955 B2 | * | 8/2008 | Matsuki et al. | 123/179.5 |
| 7,617,673 B2 | * | 11/2009 | Udono et al. | 60/285 |
| 8,065,069 B2 | * | 11/2011 | Jinno et al. | 701/102 |
| 2009/0063009 A1 | | 3/2009 | Jinno | |

FOREIGN PATENT DOCUMENTS

| | | |
|---|---|---|
| JP | 2003-175719 A | 6/2003 |
| JP | 2007 230385 | 9/2007 |
| JP | 2008 94272 | 4/2008 |
| JP | 2008 150035 | 7/2008 |
| JP | 2008 180215 | 8/2008 |

OTHER PUBLICATIONS

International Search Report issued Jul. 28, 2009 in PCT/JP09/061584 filed Jun. 25, 2009.

* cited by examiner

*Primary Examiner* — John Kwon
(74) *Attorney, Agent, or Firm* — Oblon, Spivak, McClelland, Maier & Neustadt, L.L.P.

(57) ABSTRACT

The control apparatus for a vehicle having a prime mover is applied to a vehicle having an air conditioning mechanism which performs the air conditioning in the vehicle interior by using the cooling water of the internal combustion engine. The engine stop permitting unit permits stopping the internal combustion engine based on the requested load of the internal combustion engine, when the cooling water temperature becomes equal to or higher than the engine stop permitting water temperature. The engine activating unit activates the internal combustion engine when the cooling water temperature becomes lower than the engine activation requesting water temperature, which is set to be lower than the engine stop permitting water temperature. The correcting unit corrects the engine stop permitting water temperature to be higher in the case that the vehicle speed is high, than in the case that the vehicle speed is low.

4 Claims, 8 Drawing Sheets

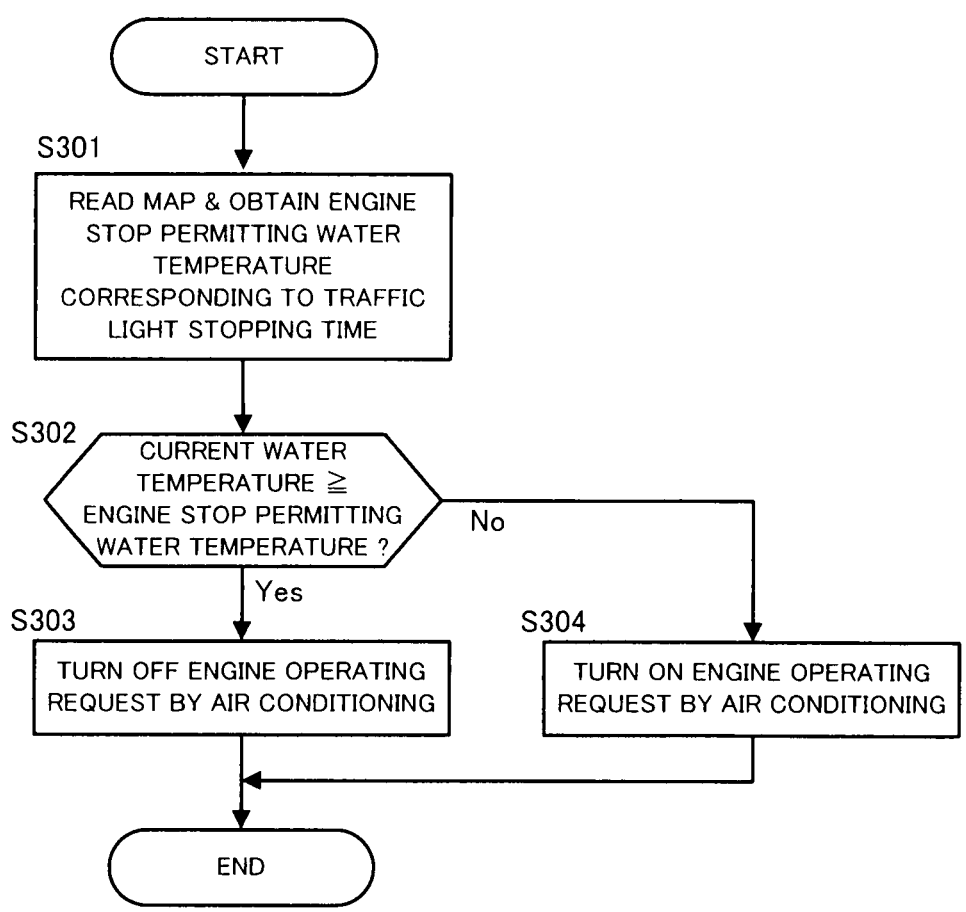

CONTROL APPARATUS FOR A VEHICLE HAVING A PRIME MOVER

TECHNICAL FIELD

The present invention relates to a control apparatus for a vehicle having a prime mover.

BACKGROUND TECHNIQUE

Conventionally, there is known a vehicle performing an air conditioning in a vehicle interior by utilizing cooling water of an engine (internal combustion engine). For example, the Patent Reference 1 proposes a technique of activating the engine when an air conditioning demand is high even during the EV traveling (i.e., the running only by the driving power of motor with stopping the engine, hereinafter used in this meaning), and continuing the EV traveling, if during the EV traveling, when the air conditioning demand is low, in a hybrid vehicle having an air conditioning mechanism of heating the air by the cooling water. By this technique, since ON/OFF of driving the engine is determined by the degree of the air conditioning demand, it is possible to appropriately meet the air conditioning request.

As another one, in the Patent Reference 2, it is proposed to suppress that the engine is frequently driven only for charging, by setting the air conditioning ability of the air conditioner to be lower at the time when the engine is stopped, than the time when the engine is being driven.

PRIOR ART REFERENCE

Patent Reference

Patent Reference 1:
Japanese Patent Application Laid-open under No. 2007-230385
Patent Reference 2:
Japanese Patent Application Laid-open under No. 2008-150035

DISCLOSURE OF INVENTION

Problem to be Solved by the Invention

By the technique described in the Patent Reference 1, after it is once judged that the air conditioning ability is sufficiently satisfactory and the EV traveling is selected, if the temperature of the cooling water becomes low due to the wind caused by the running of the vehicle, the engine tends to be re-activated because the temperature of the cooling water becomes lower than the predetermined judging temperature (hereinafter referred to as "the engine activation requesting temperature"). If such a re-activation of the engine occurs at the time of the non-accelerating driving or the moderate acceleration after the EV traveling is selected, it gives the driver a wrong feeling because the activation is against the driver's intention of re-activating the engine. The Patent Reference 2 does not disclose any method to appropriately suppress such a wrong feeling given to the driver.

The present invention is made to solve the problem described above, and it is an object of the invention to provide a control apparatus for a vehicle having a prime mover, capable of appropriately suppressing the engine start giving the driver a wrong feeling, in the vehicle having the prime mover and performing the air conditioning by using the cooling water.

Means for Solving the Problem

According to one aspect of the present invention, there is provided a control apparatus for a vehicle having a prime mover, which is applied to a vehicle comprising an internal combustion engine, a prime mover and an air conditioning mechanism which performs air conditioning by using cooling water of the internal combustion engine, the control apparatus comprising: an engine stop permitting means which permits stopping the internal combustion engine based on a requested load of the internal combustion engine, when a temperature of the cooling water becomes equal to or higher than an engine stop permitting water temperature; an engine activating means which activates the internal combustion engine when the temperature of the cooling water becomes lower than an engine activation requesting water temperature, by using the engine activation requesting water temperature which is set to be lower than the engine stop permitting water temperature; and a correcting means which corrects the engine stop permitting water temperature used by the engine stop permitting means to be higher in a case that a vehicle speed is high, than in a case that the vehicle speed is low.

The above control apparatus for a vehicle having a prime mover includes an internal combustion engine and a prime mover different from the internal combustion engine, and is preferably applied to the vehicle having an air conditioning mechanism performing the air conditioning of the vehicle interior by using the cooling water of the internal combustion engine. The engine stop permitting means permits stopping the internal combustion engine based on the requested load (requested power) of the internal combustion engine when the temperature of the cooling water (water temperature) becomes equal to or higher than the engine stop permitting water temperature. The engine activating means activates the internal combustion engine when the water temperature becomes lower than the engine activation requesting water temperature by using the engine activation requesting water temperature set to be lower than the engine stop permitting water temperature. Then, the correcting means corrects the engine stop permitting water temperature to be higher in the case that the vehicle speed is high, than in the case that the vehicle speed is low. The engine activation requesting water temperature is set to be at least lower than the engine stop permitting water temperature thus corrected.

By correcting the engine stop permitting water temperature in this manner, the engine stop permitting water temperature is corrected to be high when the vehicle speed is high, and it becomes highly possible that the water temperature becomes lower than the engine stop permitting water temperature. Therefore, the internal combustion engine is easily driven, and it is possible to appropriately suppress the water temperature decrease caused by the increase of the heat radiation amount at the time of high vehicle speed. In addition, the engine stop permitting water temperature is lower in the case that the vehicle speed is low, than in the case that the vehicle speed is high, and the engine activation requesting water temperature is set to be further lower than the engine stop permitting water temperature. Therefore, the re-activation of the internal combustion engine hardly occurs at the time of the transition from the high vehicle speed to the low vehicle speed, for example.

As described above, according to the above control apparatus for a vehicle having a prime mover, it is possible to appropriately reduce the frequency of activating the internal combustion engine against the driver's intention, at the time of the non-accelerating driving or the moderate acceleration. Therefore, it is possible to suppress the occurrence of the wrong feeling or the uncomfortable feeling of the driver caused by the activation of the internal combustion engine. For example, when the difference between the engine stop permitting water temperature and the engine activation requesting water temperature is set to be a large value of a certain degree, the frequency of activating the internal combustion engine may be effectively suppressed.

In one mode of the above control apparatus for a vehicle having a prime mover, the correcting means obtains an accelerator opening degree corresponding to a driving power request by a driver, and corrects the engine stop permitting water temperature to be higher in a case that the accelerator opening degree is high, than in a case that the accelerator opening degree is low.

In this mode, when the accelerator opening degree is high, the possibility that the driving continues is high as a result, and hence it is likely to happen that the water temperature decreases due to the increase of the heat radiation amount. Therefore, the engine stop permitting water temperature is corrected to be high. By this, in comparison with the case in which the correction is performed only based on the vehicle speed, it becomes more likely that the internal combustion engine is driven (started) in a situation that driving the internal combustion engine to increase the water temperature is desired. In contrast, when the accelerator opening degree is low, the engine stop permitting water temperature becomes low. Therefore, the internal combustion engine can be easily stopped in comparison with the case in which the correction is performed only based on the vehicle speed. Accordingly, it is possible to more efficiently reduce the frequency of activating the internal combustion engine against the driver's intention, at the time of the non-accelerating driving or the moderate acceleration.

According to another mode of the above control apparatus for a vehicle having a prime mover, a low vehicle speed predicting means is further provided which predicts that the vehicle will be driven at a low vehicle speed, and the correcting means corrects the engine stop permitting water temperature to be high when the low vehicle speed predicting means predicts that the vehicle will be driven at the low vehicle speed.

According to this mode, when it is predicted that the low speed driving is forced due to the traffic jam, for example, the engine stop permitting water temperature is corrected to be high, and hence the frequency of activating the internal combustion engine can be reduced during the driving through the traffic jam. Therefore, it is possible to appropriately reduce the activation frequency of the internal combustion engine at the low vehicle speed.

According to still another mode of the above control apparatus for a vehicle having a prime mover, the low vehicle speed predicting means predicts that the vehicle will be stopped and a vehicle stopping time, and the correcting means corrects the engine stop permitting water temperature to be higher in a case that the vehicle stopping time predicted by the low vehicle speed predicting means is long, than in a case that the vehicle stopping time is short. By this, when it is predicted that the vehicle stopping time is long, the engine stop permitting water temperature is corrected to be high, and hence it is possible to appropriately reduce the activation frequency of the internal combustion engine while the vehicle stops.

BRIEF DESCRIPTION OF THE DRAWINGS

FIG. 9 is a flowchart of an engine operation/stop determining process in the third embodiment.

PREFERRED FORM TO EXERCISE THE INVENTION

Preferred embodiments of the present invention will be described below with reference to the attached drawings.

[Configuration of Apparatus]

Figure 1:
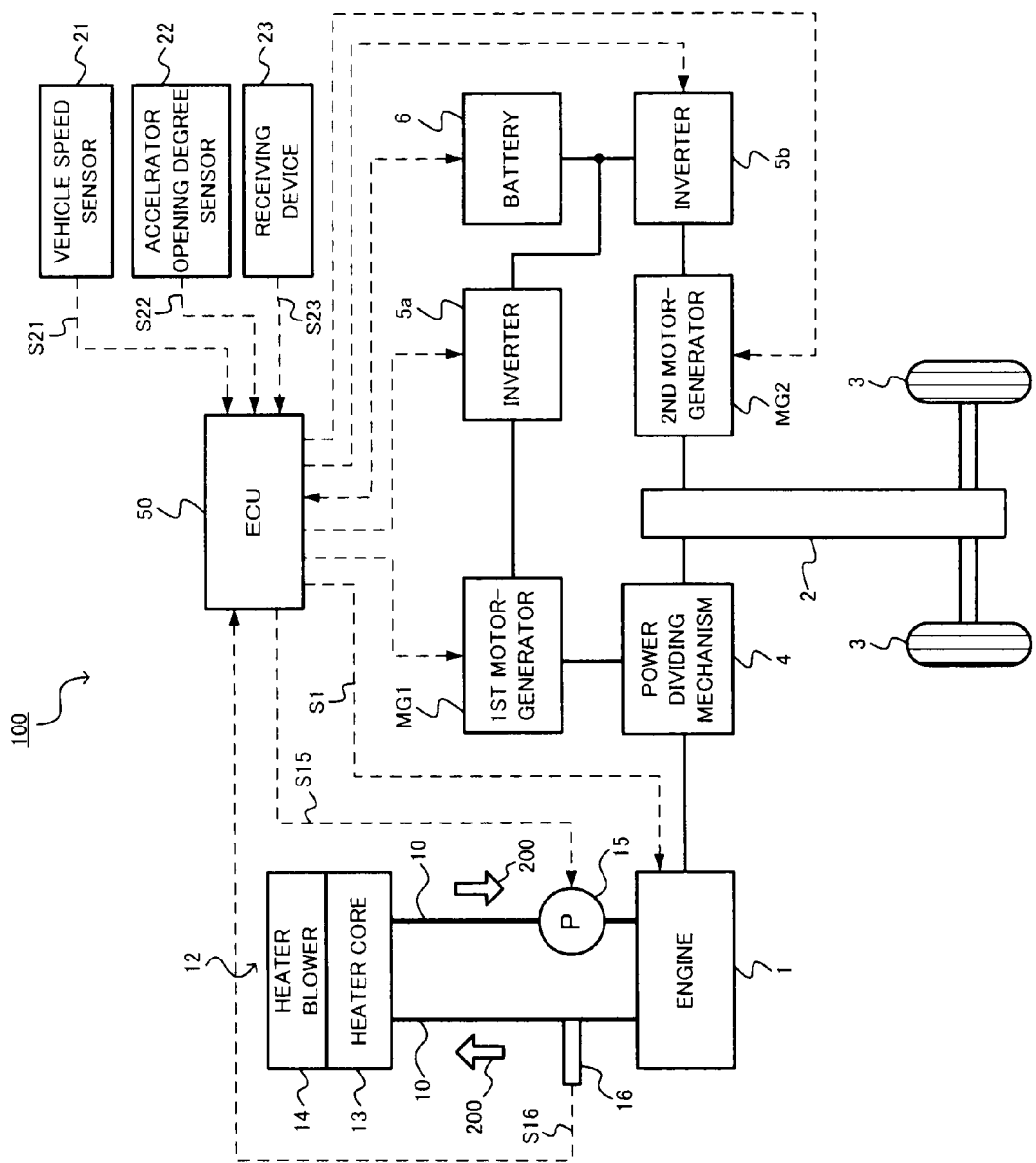
FIG. 1 shows a schematic configuration of a hybrid vehicle according to an embodiment.

FIG. 1 shows a diagram of a schematic configuration of a hybrid vehicle 100 according to an embodiment. It is noted that the broken line arrows indicate the input and output of the signals.

The hybrid vehicle 100 mainly includes an engine (internal combustion engine) 1, an axle 2, wheels 3, a first motor-generator MG1, a second motor-generator MG2, a power dividing mechanism 4, inverters 5a, 5b, a battery 6, a cooling water passage 10, an air conditioning mechanism 12, a water pump 15, a water temperature sensor 16, a vehicle speed sensor 21, an accelerator opening degree sensor 22, a receiving device 23 and an ECU (Electronic Control Unit) 50. The hybrid vehicle 100 corresponds to the vehicle having a prime mover.

The axle 2 is a part of a power transmission system which transmits the power of the engine 1 and the second motor-generator MG2 to the wheels 3. The wheels 3 are the wheels of the hybrid vehicle 100, and FIG. 1 especially shows only the right and left front wheels to simplify the explanation. The engine 1 is a gasoline engine or a diesel engine, and functions as a power source for outputting major driving force of the hybrid vehicle 100.

For the engine 1, various controls are executed by the control signal S1 supplied by the ECU 50. For example, the ECU 50 controls the operation/stop of the engine 1. In other words, the ECU 50 executes a control to switch the traveling using the driving power of the engine 1 and the traveling using only the driving force of the motor-generator MG with stopping the engine 1, i.e., the EV traveling.

The first motor-generator MG1 is configured to function as a generator to mainly charge the battery 6 or a generator to supply the electric power to the second motor-generator MG2, and performs the electric generation by the output of the engine 1. The second motor-generator MG2 is configured to function as a generator to mainly assist the output of the engine 1. The motor-generators MG1 and MG2 are configured as a synchronous motor-generator, for example, and include a rotor having plural permanent magnets on the outer circumferential surface and a stator around which three-phase coils are wound.

The power dividing mechanism 4 corresponds to the planetary gear having a sun gear and a ring gear, and is configured to distribute the output of the engine 1 to the first motor-generator MG1 and the axle 2.

The inverter 5a is a DC/AC converter which controls the input/output of the electric power between the battery 6 and the first motor-generator MG1. The inverter 5b is a DC/AC converter which controls the input/output of the electric power between the battery 6 and the second motor-generator MG2. For example, the inverter 5a converts the AC electric power generated by the first motor-generator MG1 to the DC electric power and supplies it to the battery 6, and the inverter 5b converts the DC electric power taken out from the battery 6 to the AC electric power and supplies it to the second motor-generator MG2.

The battery 6 is configured to function as a power supply to drive the first motor-generator MG1 and/or the second motor-generator MG2, and to charge the electric power generated by the first motor-generator MG1 and/or the second motor-generator MG2. In the following description, the expression of "motor-generator MG" is used when the first motor-generator MG1 and the second motor-generator MG2 are not discriminated from each other. The motor-generator corresponds to the prime mover.

As shown by the arrows 200 in FIG. 1, the cooling water for cooling the engine 1 circulates through the cooling water passage 10. On the cooling water passage 10, the air conditioning mechanism 12, the water pump 15 and the water temperature sensor 16 are provided. While other various elements such as a radiator and a thermostat are provided on the cooling water passage 10, the illustration of them is omitted in FIG. 1 for the convenience of the explanation.

The air conditioning mechanism 12 includes a heater core 13 and a heater blower 14. The heater core 13 is a device which heats the internal air by the cooling water passing through its inside, and the heater blower 14 is a device which blows the air heated by the heater core 13 to the vehicle interior. Concretely, the air in the vehicle interior taken in by the heater blower 13 is supplied to the heater core 13, and the air supplied to the heater core 13 is heated by the heat exchange with the cooling water and is blown out from the heater blower 14. Here, "the air conditioning" includes, not only the heating, but the dehumidification by the air conditioning refrigerant, and heating the cool air blown out from the air conditioning hole at the time of the dehumidification up to the air conditioner setting temperature by the heating performance of the cooling water if the cool air has the temperature equal to or lower than the air conditioner setting temperature.

The water pump 15 is configured to have an electric motor, for example, and circulates the cooling water through the cooling water passage 10 by driving the motor. The water pump 15 is controlled by the control signal S15 supplied from the ECU 50. The water temperature sensor 16 detects the temperature of the cooling water (hereinafter simply referred to as "water temperature"). The water temperature sensor 16 supplies the detection signal S16 corresponding to the detected water temperature to the ECU 50.

The vehicle speed sensor 21 detects the speed (vehicle speed) of the hybrid vehicle 100, and supplies the detection signal S21 corresponding to the detected vehicle speed to the ECU 50. The accelerator opening degree sensor 22 detects the accelerator opening degree corresponding to the driving force demand by the driver, and supplies the detection signal S22 corresponding to the detected accelerator opening degree.

The receiving device 23 is a device configured to receive electric waves from outside. For example, the receiving device 23 may be a beacon receiver or a FM tuner or a dedicated communication card, and obtains various information via the communication interface. As an example, the receiving device 23 obtains timing information of the light color change of the traffic light, from the beacon set on the road, at a position approximately 200 (m) before the traffic light (In this case, the receiving device 23 performs so-called road-vehicle communication). The receiving device 23 supplies the signal S23 corresponding to the obtained information to the ECU 50.

The ECU 50 includes a CPU (Central Processing Unit), a ROM (Read Only Memory) and a RAM (Random Access Memory), and executes various controls to each constitutional elements in the hybrid vehicle 100. For example, the ECU 50 performs determination (hereinafter referred to as "engine operation/stop determination") by using a predetermined condition to control the switching of the operation/stop of the engine 1. As described later in detail, the ECU 50 corresponds to the control apparatus for the vehicle having a prime mover according to the present invention, and functions as the engine stop permitting means, the engine activating means, the correcting means and the low vehicle speed predicting means.

Figure 2:
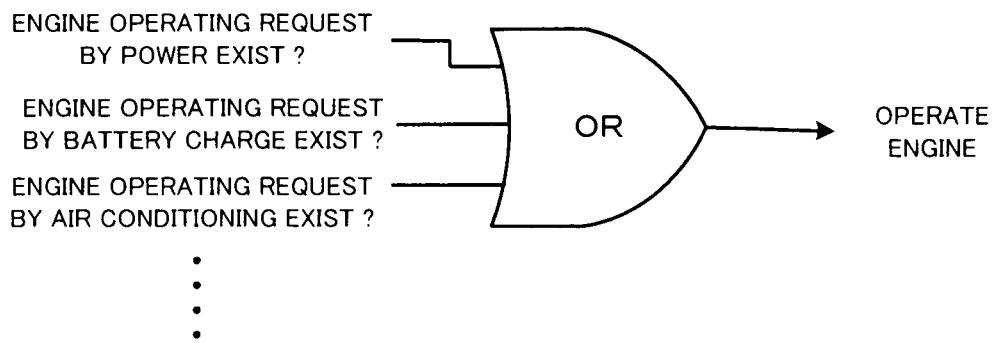
FIG. 2 is a diagram for concretely explaining an engine operation/stop determination.

Here, by referring to FIG. 2, the engine operation/stop determination will be concretely described. The ECU 50 operates the engine 1 when the request to operate the engine 1 (hereinafter referred to as "engine operating request") exists. For example, the ECU 50 activates the engine 1 during the EV traveling. It is noted that "activating" the engine means to start the engine from its stopped state.

The engine operating request is defined in accordance with the requested power from the driver, the charging request of the battery 6 and the air conditioning request of the vehicle interior, for example. As shown in FIG. 2, the ECU 50 operates the engine 1 when the engine operating request by the requested power exists, or when the engine operating request by the battery charge exists, or when the engine operating request by the air conditioning in the vehicle interior exists.

As an example, the ECU 50 performs the engine operation/stop determination in response to the engine operating request by the air conditioning as follows. The ECU 50 performs the determination for the engine operating request by the air conditioning based on the temperature of the cooling water (water temperature). Concretely, while the engine 1 is stopped (i.e., during the EV traveling), if the water temperature becomes lower than the engine activation requesting water temperature, the ECU 50 assumes that the engine operating request by air conditioning exists and operates the engine 1. This is done in order to operate the engine 1 to raise the temperature of the cooling water to appropriately secure the air conditioning performance.

In contrast, while the engine is operating, if the water temperature becomes equal to or higher than the engine stop permitting water temperature, the ECU 50 assumes that the engine operating request by the air conditioning does not exist and stops the engine 1. This is done in order perform the EV traveling to give the priority to the fuel consumption because the cooling water temperature is relatively high and the air conditioning performance seems to be secured in this situation.

The engine activation requesting water temperature corresponds to the "engine activation requesting water temperature", and the engine stop permitting water temperature corresponds to the "engine stop permitting water temperature". Basically, in order to prevent the activation and the stop of the engine 1 from occurring frequently, the engine activation requesting water temperature is set to be at least lower than the engine stop permitting water temperature. In other words, the engine stop permitting water temperature is set to be at least higher than the engine activation requesting water temperature. Concretely, the difference between the engine stop permitting water temperature and the engine activation requesting water temperature is set to be large for a certain degree so that the engine 1 is not activated due to the decrease of the water temperature immediately after the engine 1 is stopped because the water temperature exceeds the engine stop permitting water temperature, for example. Namely, the engine stop permitting water temperature and the engine activation requesting water temperature have a hysteresis characteristic.

More specifically, the ECU 50 issues the permission of stopping the engine 1 in accordance with the requested power (requested load). Namely, when it is determined that continuously operating the engine 1 is necessary to satisfy the requested power, the ECU 50 continues the operation of the engine 1, even if the water temperature becomes equal to or higher than the engine stop permitting water temperature. In contrast, when it is determined that continuously operating the engine 1 is not necessary to satisfy the requested power, the ECU 50 stops the engine 1 when the water temperature becomes equal to or higher than the engine stop permitting water temperature.

[Control Method]

Next, the control method performed by the ECU 50 in this embodiment will be described. In this embodiment, the ECU 50 changes the contents of the condition used in the engine operating request by the air conditioning, based on the current traveling state and/or the future traveling state of the hybrid vehicle 100. Concretely, the ECU 50 corrects the above-mentioned engine stop permitting water temperature. In this case, the ECU 50 corrects the engine stop permitting water temperature so as to appropriately suppress the occurrence of the driver's wrong feeling caused by the activation of the engine 1 in response to the engine operating request by the air conditioning.

Figure 3:
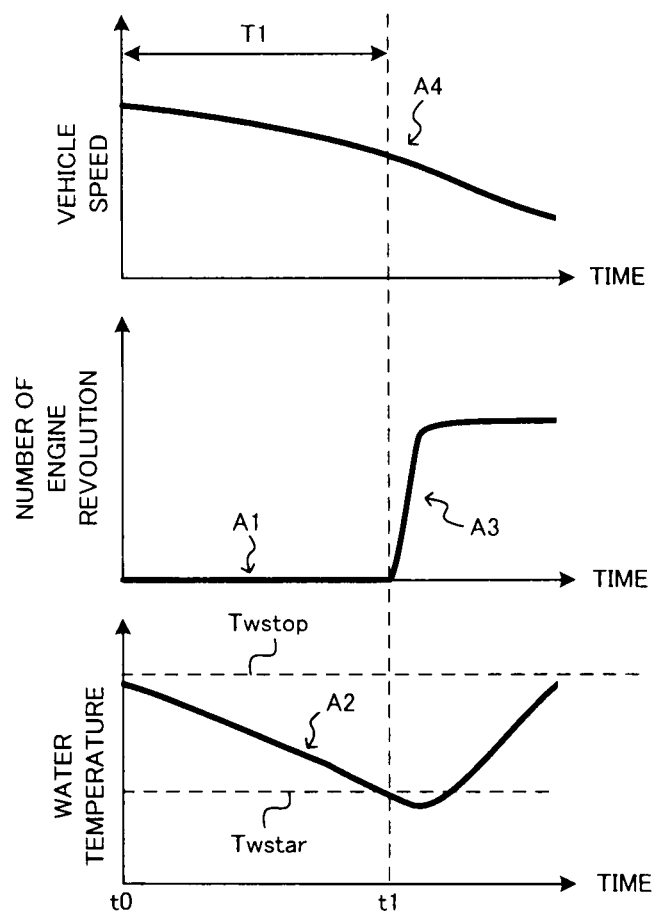
FIG. 3 is a diagram for concretely explaining a wrong feeling of a driver possibly caused by an activation of the engine.

By referring to FIG. 3, the driver's wrong feeling that may occur due to the activation of the engine 1 will be concretely described. FIG. 3 shows the examples of the timely change of the vehicle speed, the number of engine revolution and the water temperature from upside to down side in this order. Here, the description will be made for the case that the engine stop permitting water temperature is not corrected, i.e., a constant value is used as the engine stop permitting water temperature.

In FIG. 3, "Twstar" corresponds to the engine activation requesting water temperature, and "Twstop" corresponds to the engine stop permitting water temperature. As described above, the engine activation requesting water temperature Twstar is set to be the lower temperature than the engine stop permitting water temperature Twstop, so that the activation and stop of the engine 1 do not frequently occur.

As shown by the arrow A1 in FIG. 3, the engine 1 stops during the time period T1 (i.e., before the time t1), and the EV traveling is performed. It is assumed that the water temperature becomes higher than the engine stop permitting water temperature Twstop and hence the engine 1 is stopped before the time t0. During the EV traveling in the period T1, the water temperature decreases as shown by the arrow A2. This supposed to be caused by the use of the heat of the cooling water for the air conditioning and/or the radiation of the heat to the atmosphere. Particularly, the water temperature easily decreases because the heat radiation amount of the cooling water increases by the vehicle traveling wind.

After that, at the time t1, the water temperature becomes lower than the engine activation requesting water temperature Twstar. Therefore, it is determined that the engine operating request exists, and the engine 1 is activated as shown by the arrow A3. In this case, the engine 1 is activated during the deceleration as shown by the arrow A4. Such an activation of the engine 1 is not caused by the operation of the accelerator by the driver and is therefore against the driver's intention of deceleration. Therefore, the driver may feel the wrong feeling. For example, the driver may feel uncomfortable due to the vibration caused at the time of activating the engine 1.

Such a wrong feeling of the driver may occur not only when the vehicle is decelerating, but also when the vehicle is stopped. Namely, if the water temperature decreases and the engine 1 is activated when the vehicle is stopped, such an activation is against the driver's intention and may give the driver a wrong feeling. When the engine 1 is configured by the diesel engine, such a wrong feeling of the driver caused by the activation of the engine 1 easily occurs because the diesel engine has a relatively small water heat and hence the water temperature easily decreases.

In view of the above, in this embodiment, the engine operating request by the air conditioning is generated so that the occurrence of the driver's wrong feeling caused by the activation of the engine 1 described above is appropriately suppressed. Concretely, the ECU 50 corrects the engine stop permitting water temperature to control the timing of stopping the engine 1 such that the activation of the engine 1 against the driver's intention is appropriately suppressed at the time of the non-accelerating driving or the moderate acceleration. In this case, the ECU 50 corrects the engine stop permitting water temperature based on the current traveling state and/or the future traveling state of the hybrid vehicle 100.

Next, the concrete embodiments (first to third embodiments) of correcting the engine stop permitting water temperature will be described.

1st Embodiment

In the first embodiment, the ECU 50 corrects the engine stop permitting water temperature based on the vehicle speed of the hybrid vehicle 100. Concretely, the ECU 50 performs the correction to increase the engine stop permitting water temperature to be high in the case that the vehicle speed is high, compared with case that the vehicle speed is low.

In addition, the ECU 50 sets the engine activation requesting water temperature to be at least lower than the engine stop permitting water temperature thus corrected. Concretely, the ECU 50 sets the difference between the engine stop permitting water temperature and the engine activation requesting water temperature to be large to a certain degree so that the activation and the stop of the engine 1 do not frequently occur. Namely, the engine stop permitting water temperature and the engine activation requesting water temperature have a hysteresis characteristic.

By the first embodiment, in comparison with the case that the engine stop permitting water temperature is not corrected, the water temperature becomes lower than the engine stop permitting water temperature with high possibility when the vehicle speed is high. Therefore, the engine 1 is easily driven when the vehicle speed is high. In other words, the engine 1 is hardly stopped. By this, it is possible to suppress the above mentioned decrease of the water temperature caused by the increased heat radiation amount by the vehicle traveling wind (such water temperature decrease is remarkable when the vehicle speed is high). Therefore, when the vehicle speed is high, it is possible to keep the water temperature at a high temperature of a certain degree.

On the other hand, if such a correction is performed, when the vehicle speed is low, the engine stop permitting water temperature becomes low in comparison with the case that the vehicle speed is high. As described above, the engine activation requesting water temperature is set to be further lower than the engine stop permitting water temperature. Concretely, the difference between the engine activation requesting water temperature and the engine stop permitting water temperature is set to be a large value of a certain degree. Therefore, when the vehicle changes from the high speed to the low speed, for example, the water temperature becomes higher than the engine activation requesting water temperature with high possibility. Therefore, the re-activation of the engine 1 at the time of the deceleration hardly occurs.

As described above, according to the first embodiment, it is possible to appropriately reduce the frequency of activating the engine 1 (i.e., the hunting of the activation/stop) against the driver's intention, at the non-accelerating driving or the moderate acceleration, while keeping the air conditioning performance. Therefore, it is possible to suppress the occurrence of the driver's wrong feeling or uncomfortable feeling caused by the activation of the engine 1.

Next, by referring to FIGS. 4 and 5, the description will be given of a concrete example of the correction method of the engine stop permitting water temperature according to the first embodiment. Here, the example of calculating the engine stop permitting water temperature by using the map defined by the vehicle speed will be described.

Figure 4A:
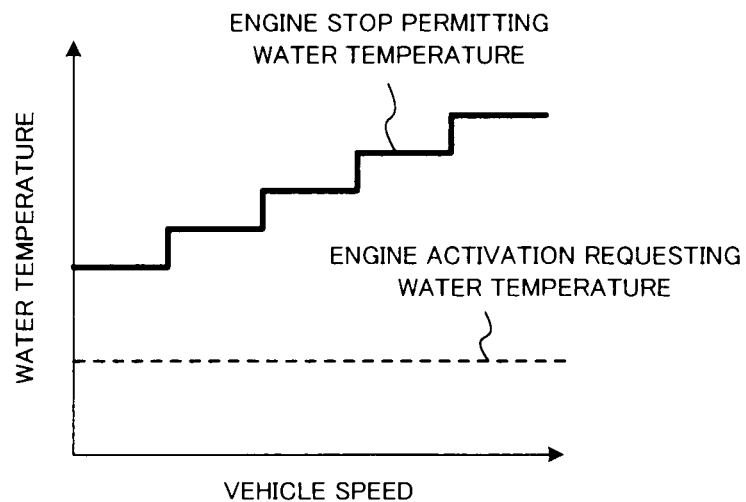
FIGS. 4A and 4B show examples of the map for determining an engine stop permitting water temperature in a first embodiment.
Figure 4B:
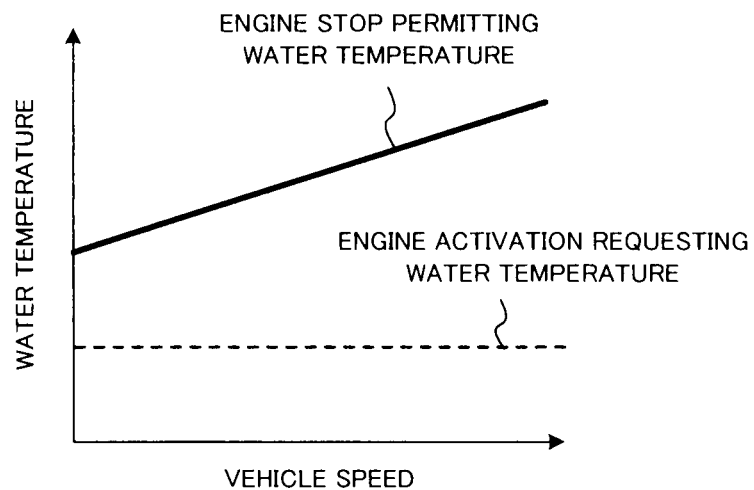

FIGS. 4A and 4B show examples of the map used to determine the engine stop permitting water temperature in the first embodiment. FIG. 4A shows the vehicle speed by the horizontal axis and shows the water temperature by the vertical axis. FIG. 4A shows a first example of the map of the first embodiment. As shown in FIG. 4A, in the map of the first example, the relation of the vehicle speed and the engine stop permitting water temperature is defined such that the engine stop permitting water temperature increases stepwise as the vehicle speed increases. FIG. 4B shows the vehicle speed by the horizontal axis and shows the water temperature by the vertical axis. FIG. 4B shows a second example of the map of the first embodiment. As shown in FIG. 4B, in the map of the second example, the relation of the vehicle speed and the engine stop permitting water temperature is defined such that the engine stop permitting water temperature linearly increases as the vehicle speed increases. For the comparison with the engine stop permitting water temperature described above, FIGS. 4A and 4B also show the engine activation requesting water temperature. As shown, the difference between the engine stop permitting water temperature and the engine activation requesting water temperature is set to be large for a certain degree.

The ECU 50 obtains the engine stop permitting water temperature corresponding to the current vehicle speed by referring to the map shown in FIG. 4A or 4B. For example, from the map shown in FIG. 4A or 4B, the engine stop permitting water temperature 70 (° C.) is obtained for the vehicle speed about 5 (km/h), and the engine stop permitting water temperature 76 (° C.) is obtained for the vehicle speed about 60 (km/h). In this example, the engine activation requesting water temperature is set to 67 (° C.), for example.

The map shown in FIG. 4A or 4B is produced by the experiment, in advance, and stored in a memory or the like. The present invention is not limited to the use of the maps show in FIGS. 4A and 4B. It is possible to use such a map that the engine stop permitting water temperature increases in a manner of a quadratic function as the vehicle speed becomes high.

Figure 5:
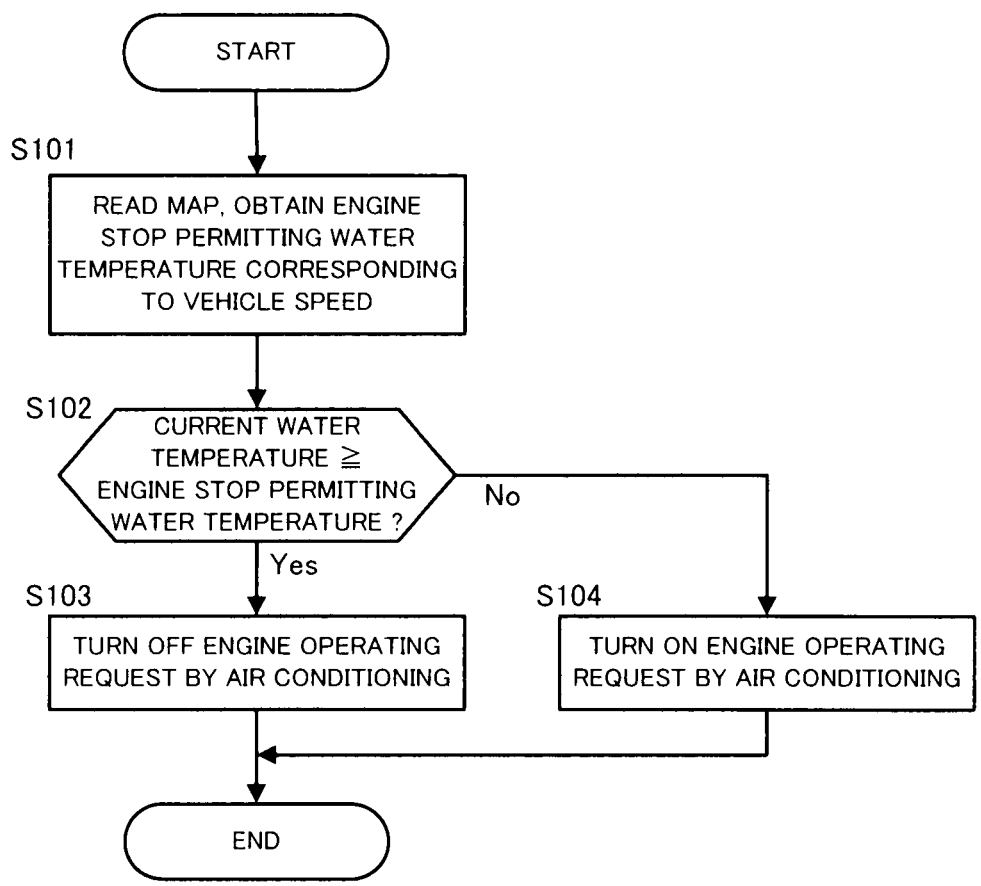
FIG. 5 is a flowchart of an engine operation/stop determining process in the first embodiment.

FIG. 5 is a flowchart showing the engine operation/stop determination process according to the first embodiment. This process is executed to determine the operation/stop of the engine 1 in accordance with the engine operating request by the air conditioning. Concretely, the process is not executed under the condition that the stop permitting condition of the engine 1 is established, but is executed only under the condition that the operating requesting condition by which the engine 1 is being operated is established. In addition, this process is repeatedly executed by the ECU 50 with a predetermined cycle.

First, in step S101, the ECU 50 read the map defining the relation between the vehicle speed and the engine stop permitting water temperature, and obtains the engine stop permitting water temperature corresponding to the current vehicle speed. The ECU 50 refers to the map shown in FIG. 4A or 4B, for example, to obtain the engine stop permitting water temperature corresponding to the vehicle speed obtained from the vehicle speed sensor 21. Then, the process goes to step S102.

In step S102, the ECU 50 determines whether or not the current water temperature obtained from the water temperature sensor 16 is equal to or higher than the engine stop permitting water temperature obtained in step S101. Here, it is determined whether or not stopping the engine 1 is permitted.

When the current water temperature is equal to or higher than the engine stop permitting water temperature (step S102; Yes), the process goes to step S103. In this case, since the engine 1 can be stopped, the ECU 50 turns off the engine operating request by the air conditioning request. (step S103). Then, the process ends. Even if the engine operating request by the air conditioning request is turned off in this way, there may be a case that the engine 1 is not stopped when the engine operating request by the required power exists.

On the contrary, when the current water temperature is lower than the engine stop permitting water temperature (step S102; No), the process goes to step S104. In this case, since the engine 1 should not be stopped, the ECU 50 turns on the engine operating request by the air conditioning request (step S104). Then, the process ends.

While the above first embodiment shows the example to obtain the engine stop permitting water temperature by using the map, the engine stop permitting water temperature corresponding to the vehicle speed may be obtained by using a predetermined arithmetic expression, instead of using the map.

2nd Embodiment

Next, the second embodiment will be described. The second embodiment is different from the first embodiment in that the engine stop permitting water temperature is corrected based on not only the vehicle speed but the accelerator opening degree. Namely, in the second embodiment, the engine stop permitting water temperature is corrected in consideration of the accelerator opening degree reflecting the driver's intention.

Also in the second embodiment, the ECU 50 sets the engine activation requesting water temperature to be at least lower than the engine stop permitting water temperature after the correction. Concretely, the ECU 50 sets the difference between the engine stop permitting water temperature and the engine activation requesting water temperature to a large value of a certain degree, so that the activation and the stop of the engine 1 do not frequently occur. Namely, the engine stop permitting water temperature and the engine activation requesting water temperature have a hysteresis characteristic. More concretely, in the second embodiment, in addition to the control of the first embodiment, the ECU 50 performs the correction of increasing the engine stop permitting water temperature to be higher in a case that the accelerator opening degree is high, than in the case that the accelerator opening degree is low. This is because, when the accelerator opening degree is high, the possibility of continuous driving is high as a result, and hence it is supposed that the heat radiation amount by the vehicle traveling wind becomes larger and the water temperature easily decreases. Namely, when the accelerator opening degree is high, it is desired to operate the engine 1 to suppress the water temperature decrease.

Therefore, in the second embodiment, the engine stop permitting water temperature is corrected in consideration of not only the vehicle speed but also the accelerator opening degree. Namely, not only when the vehicle speed is high, but also when the accelerator opening degree is high, the correction is performed to increase the engine stop permitting water temperature. By this, even if the vehicle speed is not so high, normally when the accelerator opening degree is high, it is highly possible that the vehicle speed increases after that, and therefore the engine stop permitting water temperature can be high in such a case. Accordingly, in the second embodiment, in comparison with the first embodiment in which the correction is performed only by using the vehicle speed, the engine 1 is easily driven (started) in a situation where operating the engine 1 to increase the water temperature is desired.

Further, according to the second embodiment, the engine stop permitting water temperature becomes low when the accelerator opening degree is low, in comparison with the case when the accelerator opening degree is high. As described above, the engine activation requesting water temperature is set to be further lower than that engine stop permitting water temperature. Concretely, the difference between the engine activation requesting water temperature and the engine stop permitting water temperature is set to be a large value of a certain degree. By this, even if the vehicle speed is not so high, normally when the accelerator opening degree is high, it is highly possible that the vehicle speed increases after that, and therefore the engine stop permitting water temperature can be high in such a case. Accordingly, in the second embodiment, in comparison with the first embodiment in which the correction is performed only by using the vehicle speed, the engine 1 is easily stopped in a situation where the engine 1 is not to be activated, e.g., at the time of deceleration.

As described above, according to the second embodiment, since the engine stop permitting water temperature is corrected in consideration of the accelerator opening degree reflecting the driver's intention, it is possible to effectively reduce the activation frequency (i.e., the hunting of activation/stop) of the engine against the driver's intention at the time of non-accelerating driving or the moderate acceleration. Therefore, it is possible to effectively suppress the occurrence of the driver's wrong feeling or uncomfortable feeling caused by the activation of the engine 1.

Next, by referring to FIGS. 6A, 6B and 7, the concrete example of the correcting method of engine stop permitting water temperature in the second embodiment will be described. Here, the description will be given of an example in which the map used for obtaining the engine stop permitting water temperature is switched between the time when the accelerator is on (hereinafter referred to as "accelerator-on time") and the time when the accelerator is off (hereinafter referred to as "accelerator-off time"). This example uses such a map that the engine stop permitting water temperature of high temperature is obtained at the accelerator-on time, compared with the accelerator-off time.

Figure 6A:
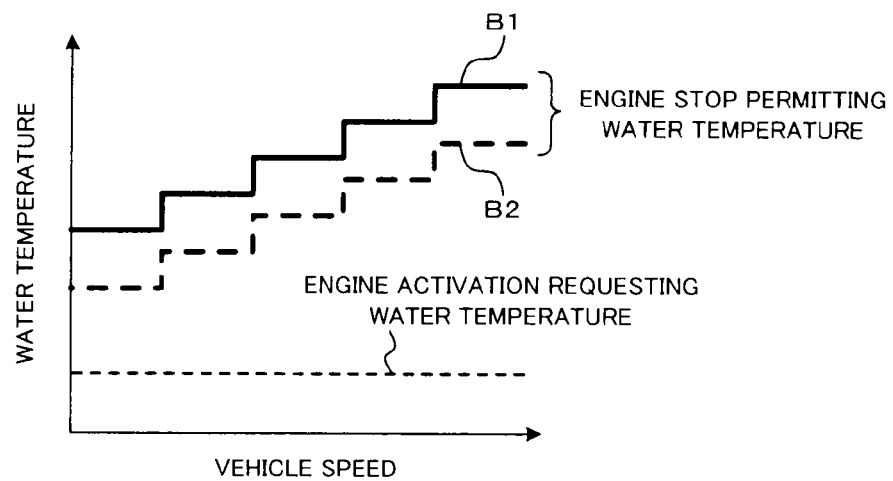
FIGS. 6A and 6B show examples of the map for determining the engine stop permitting water temperature in a second embodiment.
Figure 6B:
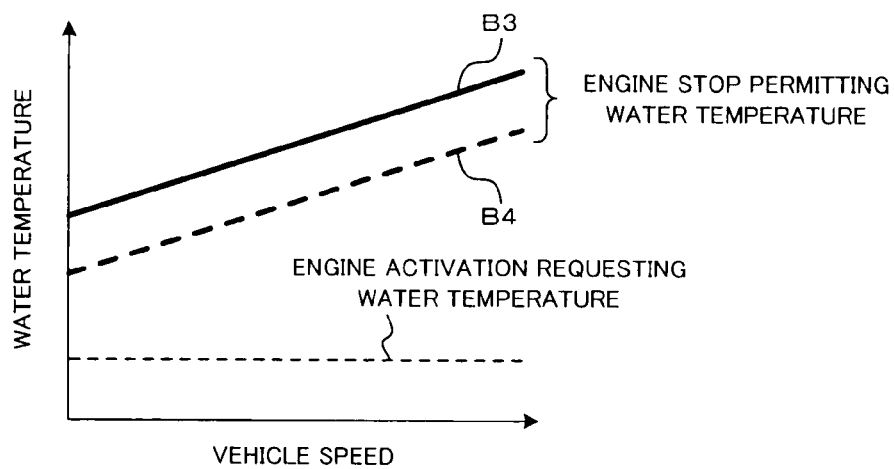

FIGS. 6A and 6B show examples of the map used to obtain the engine stop permitting water temperature in the second embodiment. FIG. 6A shows the vehicle speed in the horizontal axis and the water temperature in the vertical axis. FIG. 6A shows the maps of the first example in the second embodiment. Concretely, the solid line shows the map B1 of the accelerator-on time, and the broken line shows the map B2 of the accelerator-off time. In the maps B1 and B2 in the first example, the relation between the vehicle speed and the engine stop permitting water temperature is defined such that the engine stop permitting water temperature increases stepwise as the vehicle speed increases. As shown in FIG. 6A, it is understood that the engine stop permitting water temperature of relatively high temperature can be obtained from the map B1 of the accelerator-on time, compared with that obtained from the map B2 of the accelerator-off time. In FIG. 6A, for the comparison with the engine stop permitting water temperature, the engine activation requesting water temperature is also shown. As shown, the difference between the engine stop permitting water temperature and the engine activation requesting water temperature is set to be a large value of a certain degree.

FIG. 6B shows the vehicle speed in the horizontal axis and the water temperature in the vertical axis. FIG. 6B shows the maps of the second example in the second embodiment. Concretely, the solid line shows the map B3 of the accelerator-on time, and the broken line shows the map B4 of the accelerator-off time. In the maps B3 and B4, the relation between the vehicle speed and the engine stop permitting water temperature is defined such that the engine stop permitting water temperature increases linearly as the vehicle speed increases. As shown in FIG. 6B, it is understood that the engine stop permitting water temperature of relatively high temperature can be obtained from the map B3 of the accelerator-on time, compared with that obtained from the map B4 of the accelerator-off time. In FIG. 6B, for the comparison with the engine stop permitting water temperature, the engine activation requesting water temperature is also shown. As shown, the difference between the engine stop permitting water temperature and the engine activation requesting water temperature is set to be a large value of a certain degree.

The ECU 50 obtains the engine stop permitting water temperature by referring to the maps shown in FIG. 6A or 6B. Concretely, the ECU 50 selects one of the map B1 of the accelerator-on time and the map B2 of the accelerator-off time in accordance with whether the accelerator is on or off. Or, the ECU 50 selects one of the map B3 of the accelerator-on time and the map B4 of the accelerator-off time shown in FIG. 6B. Then, the ECU 50 obtains the engine stop permitting water temperature corresponding to the current vehicle speed, by referring to the selected map.

For example, from the map B1 or the map B3 of the accelerator-on time, the engine stop permitting water temperature 74 (° C.) is obtained when the vehicle speed is about 5 (km/h), and the engine stop permitting water temperature 78 (° C.) is obtained when the vehicle speed is about 60 (km/h). From the map B2 or the map B4 of the accelerator-off time, the engine stop permitting water temperature 70 (° C.) is obtained when the vehicle speed is about 5 (km/h), and the engine stop permitting water temperature 76 (° C.) is obtained when the vehicle speed is about 60 (km/h). In this example, the engine activation requesting water temperature is set to be 67 (° C.), for example.

The maps shown in FIGS. 6A and 6B are produced by the experiment performed in advance, and stored in a memory or the like. The present invention is not limited to the use of the map having the shape shown in FIGS. 6A and 6B. For example, it is possible to use such a map that the engine stop permitting water temperature increases in a manner of a quadratic function as the vehicle speed becomes high.

Figure 7:
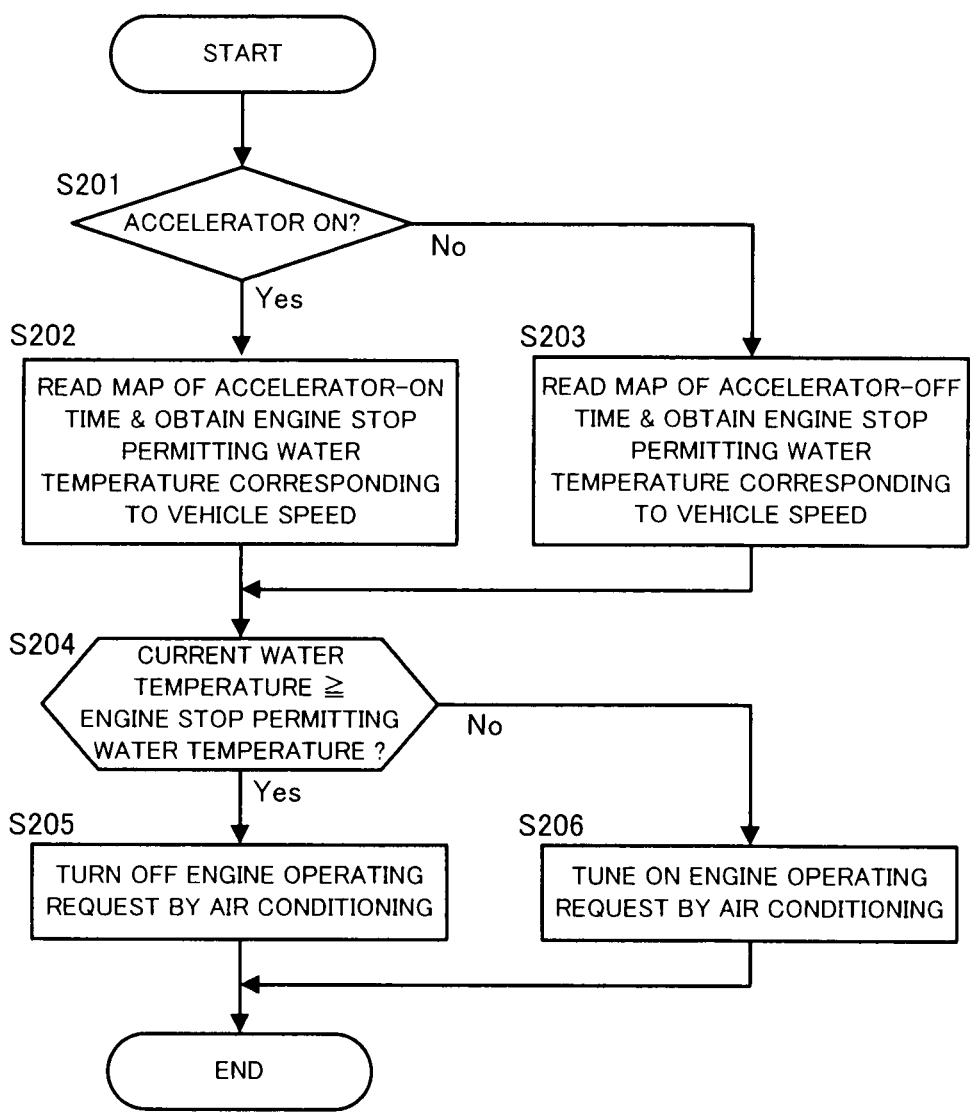
FIG. 7 is a flowchart of an engine operation/stop determining process in the second embodiment.

FIG. 7 is a flowchart showing the engine operation/stop determination process according to the second embodiment. This process is also executed to determine the operation/stop of the engine 1 in accordance with the engine operating request by the air conditioning. Concretely, the process is not executed under the condition that the stop permitting condition of the engine 1 is established, but is executed only under the condition that the operation request condition by which the engine 1 is being operated is established. In addition, this process is repeatedly executed by the ECU 50 with a predetermined cycle.

First, in step S201, it is determined whether or not the accelerator is on, based on the accelerator opening degree obtained from the accelerator opening degree sensor 22. When the accelerator is on (step S201; Yes), the process goes to step S202. In this case, the ECU 50 reads the map of the accelerator-on time, and obtains the engine stop permitting water temperature corresponding to the current vehicle speed (step S202). The ECU 50 obtains the engine stop permitting water temperature corresponding to the vehicle speed obtained from the vehicle speed sensor 21 by referring to the map B1 shown in FIG. 6A or the map B3 shown in FIG. 6B, for example. Then, the process goes to step S204.

On the contrary, when the accelerator is not on (step S201; No), i.e., the accelerator is off, the process goes to step S203. In this case, the ECU 50 reads the map of the accelerator-off time, and obtains the engine stop permitting water temperature corresponding to the current vehicle speed (step S203). The ECU 50 obtains the engine stop permitting water temperature corresponding to the vehicle speed obtained from the vehicle speed sensor 21 by referring to the map B2 shown in FIG. 6A or the map B4 shown in FIG. 6B, for example. Then, the process goes to step S204.

The process of the following steps S204 to S206 are the same as those of the steps S102 to S104, respectively, and therefore the description thereof will be omitted.

The above second embodiment shows the example of switching two maps, i.e., the maps of the accelerator-on time and the accelerator-off time. However, the present invention is not limited to this example. In another example, three or more maps may be set in accordance with the accelerator opening degree, and the engine stop permitting water temperature may be obtained based on the map selected based on the current accelerator opening degree. Further, instead of using the map, the engine stop permitting water temperature may be obtained in accordance with the accelerator opening degree and the vehicle speed by using a predetermined arithmetic expression.

3rd Embodiment

Next, the third embodiment will be described. The third embodiment is different from the first and the second embodiments in that whether or not the hybrid vehicle 100 will be driven at the low vehicle speed is predicted, in stead of the vehicle speed and the accelerator opening degree, and the engine stop permitting water temperature is corrected based on the result of the prediction. Concretely, in the third embodiment, the ECU 50 corrects the engine stop permitting water temperature to be high when it is predicted that the hybrid vehicle 100 will be hereafter driven at the low vehicle speed. The "low vehicle speed" includes the stopped state (the vehicle speed zero).

Also in the third embodiment, the ECU 50 sets the engine activation requesting water temperature to be at least lower than the engine stop permitting water temperature after the correction. Concretely, the ECU 50 sets the difference between the engine stop permitting water temperature and the engine activation requesting water temperature to be a large value of a certain degree, so that the activation and the stop of the engine 1 do not occur frequently. Namely, the engine stop permitting water temperature and the engine activation requesting water temperature have a hysteresis characteristic.

More concretely, the ECU 50 predicts whether or not the hybrid vehicle 100 will be hereafter forced to drive at the low vehicle speed due to the external factor such as the traffic state and the traffic rule. In one example, the ECU 50 predicts that the hybrid vehicle will be hereafter forced, by the traffic jam, to drive at the low vehicle speed by using the traffic information received by the receiving device 23 and/or the navigation apparatus loaded on the hybrid vehicle 100. In another example, the ECU 50 predicts that the hybrid vehicle 100 will be hereafter stopped because of the red traffic light by using the timing information of the change of the traffic light, which the receiving device 23 receives from the beacon.

The reason to correct the engine stop permitting water temperature to be high when the vehicle is predicted to be driven hereafter at low vehicle speed is that, if the driving at the low vehicle speed is forced due to the traffic jam or the like, the heat radiation amount of the cooling water, precisely the integral value of the heat radiation amount becomes large during the driving and hence the water temperature easily decreases. Namely, in such a case, it is desired to keep the engine driven to suppress the decrease of the water temperature.

Therefore, in the third embodiment, the ECU 50 corrects the engine stop permitting water temperature to be high when it is predicted that the vehicle will be hereafter driven at low vehicle speed. By this, the frequency of activating the engine 1 during the driving through the traffic jam will be reduced. Accordingly, in the third embodiment, it is possible to appropriately reduce the frequency of activating the engine 1 (i.e., the hunting of activation/stop) at the low vehicle speed against the driver's intention.

Next, by referring to FIGS. 8A, 8B and 9, the concrete example of the correction method of the engine stop permitting water temperature in the third embodiment will be described. Here, the description will be given of the example in which the engine stop permitting water temperature is corrected by predicting whether or not the hybrid vehicle 100 will be stopped. In this case, the ECU 50 predicts that the hybrid vehicle 100 will be hereafter stopped and further the stopping time, and corrects the engine stop permitting water temperature to be higher in the case that the stopping time is long, than in the case that the stopping time is short.

Concretely, the ECU 50 uses the stopping time at the red traffic light (hereinafter referred to as "traffic light stopping time" as the stopping time, and corrects the engine stop permitting water temperature to be higher in the case that the traffic light stopping time is long, than in the case that the traffic light stopping time is short. This is because, since the integral value of the heat radiation amount of the cooling water is large and the water temperature easily decreases when the vehicle is stopping, it is desired to keep the engine 1 driving. The traffic light stopping time may be obtained by using the timing information of change of the traffic light obtained via the receiving device 23 or the map information of the navigation apparatus, for example. In addition, the timing information is obtained from the beacon set on a road at the position approximately 200 (m) before the traffic light by the road-vehicle communication.

Figure 8A:
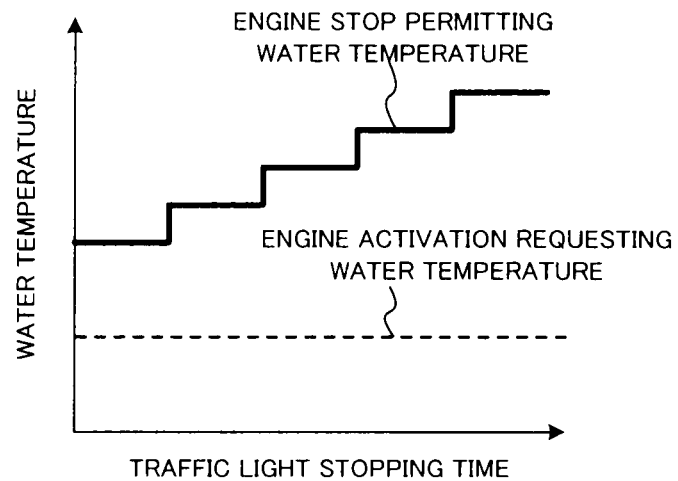
FIGS. 8A and 8B show examples of the map for determining an engine stop permitting water temperature in a third embodiment.
Figure 8B:
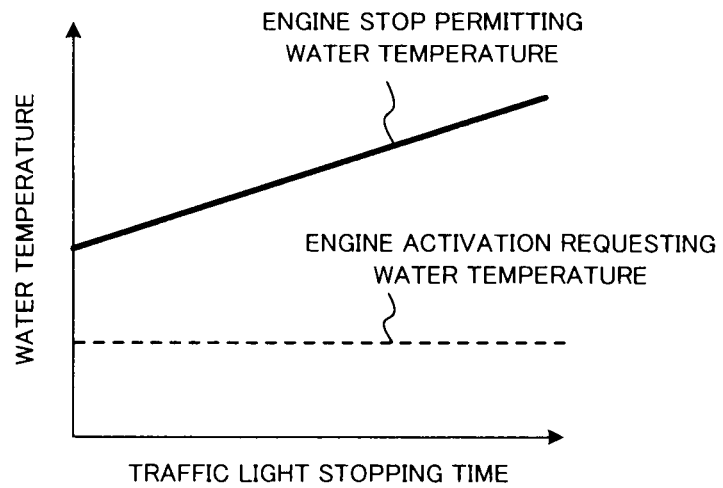

FIGS. 8A and 8B show examples of the map used to obtain the engine stop permitting water temperature in the third embodiment. FIG. 8A shows the traffic light stopping time in the horizontal axis, and shows the water temperature in the vertical axis. FIG. 8A shows a first example of the map in the third embodiment. As shown in FIG. 8A, in the map of the first example, the relation between the traffic light stopping time and the engine stop permitting water temperature is defined such that the engine stop permitting water temperature increases stepwise as the traffic light stopping time becomes long. FIG. 8B shows the traffic light stopping time in the horizontal axis, and shows the water temperature in the vertical axis. FIG. 8B shows a second example of the map in the third embodiment. As shown in FIG. 8B, in the map of the second example, the relation between the traffic light stopping time and the engine stop permitting water temperature is defined such that the engine stop permitting water temperature increases linearly as the traffic light stopping time becomes long. For the comparison with the engine stop permitting water temperature described above, FIGS. 8A and 8B also show the engine activation requesting water temperature. As shown, the difference between the engine stop permitting water temperature and the engine activation requesting water temperature is set to be a large value of a certain degree.

The ECU 50 obtains the traffic light stopping time as described above, and obtains the engine stop permitting water temperature corresponding to the obtained traffic light stopping time by referring to the map of FIG. 8A or 8B. For example, from the map shown in FIG. 8A or 8B, the engine stop permitting water temperature 70 (° C.) is obtained when the traffic light stopping time is approximately 10 (s), and the engine stop permitting water temperature 76 (° C.) is obtained when the traffic light stopping time is approximately 60 (s). In this example, the engine activation requesting water temperature is set to be 67 (° C.), for example.

The maps shown in FIGS. 8A and 8B are produced by the experiment performed in advance, and stored in a memory or the like. The present invention is not limited to the use of the map having the shape shown in FIGS. 8A and 8B. For example, it is possible to use the map that the engine stop permitting water temperature increases in a manner of a quadratic function as the traffic light stopping time becomes long.

FIG. 9 is a flowchart showing the engine operation/stop determination process according to the third embodiment. This process is also executed to determine the operation/stop of the engine 1 in accordance with the engine operating request by the air conditioning. Concretely, the process is not executed under the condition that the stop permitting condition of the engine 1 is established, but is executed only under the condition that the driving request condition by which the engine 1 is being operating is established. In addition, this process is repeatedly executed by the ECU 50 with a predetermined cycle.

First, in step S301, the ECU 50 reads the map defining the relation between the traffic light stopping time and the engine stop permitting water temperature, and obtains the engine stop permitting temperature corresponding to the traffic light stopping time. In this case, the ECU 50 obtains the traffic light stopping time of the red traffic light by using the timing information of the change of the traffic light obtained from the receiving device 23 or the map information in the navigation apparatus. Then, the ECU 50 obtains the engine stop permitting water temperature corresponding to the obtained traffic light stopping time by referring to the map shown in FIG. 8A or 8B, for example. Then, the process goes to step S302.

The process of steps S302 to S304 are the same as the process of steps S102 to S104 shown in FIG. 5, respectively, and therefore the description thereof will be omitted.

While the above third embodiment shows the example of correcting the engine stop permitting water temperature without using the vehicle speed and the accelerator opening degree, the application of the present invention is not limited to this example. In another example, the engine stop permitting water temperature may be corrected by using the vehicle speed or by using both the vehicle speed and the accelerator opening degree, in addition to the prediction result of whether the hybrid vehicle 100 will be hereafter driven at low vehicle speed. For example, when the ECU 50 predicts that the vehicle will be hereafter driven at low vehicle speed, it corrects the engine stop permitting water temperature in a manner described in the third embodiment. As an example, when the ECU 50 performs the correction based on the traffic light stopping time. On the contrary, when the ECU 50 does not predict that the vehicle will be hereafter driven at low vehicle speed, it corrects the engine stop permitting water temperature by using the vehicle speed as described in the first embodiment or by using the vehicle speed and the accelerator opening degree as described in the second embodiment.

Modified Example

The present invention is not limited to the application to the hybrid vehicle, concretely the hybrid vehicle configured to perform the EV traveling. The present invention is also applicable to a vehicle called "idle stop vehicle" or "eco-run vehicle" configured to travel with stopping the engine during the deceleration before stopping the vehicle.

While a constant value is used as the engine activation requesting water temperature in the above embodiments, a variable value may be used as the engine activation requesting water temperature, instead. When the variable value is used as the engine activation requesting water temperature, the engine activation requesting temperature is set to be at least lower than the engine stop permitting water temperature. Concretely, the engine activation requesting water temperature is corrected to be lower than the engine stop permitting water temperature in such a range that the difference between the engine stop permitting water temperature and the engine activation requesting water temperature becomes large, so as to appropriately reduce the activation frequency of the engine 1. For example, the engine activation requesting water temperature may be slightly increased according to the increase of the vehicle speed, or may be decreased according to the increase of the vehicle speed. The engine activation requesting water temperature may be slightly increased according to the increase of the accelerator opening degree, or may be decreased according to the increase of the accelerator opening degree. The engine activation requesting water temperature may be slightly increased or decreased in the case that the driving at low vehicle speed due to the traffic jam is predicted, in comparison with the case that the driving at low vehicle speed is not predicted.

INDUSTRIAL APPLICABILITY

This invention can be used for a hybrid vehicle.

DESCRIPTION OF REFERENCE NUMBERS

1 Engine
4 Power Dividing Mechanism
6 Battery
10 Cooling Water Passage
12 Air Conditioning Mechanism
15 Water Pump
16 Water Temperature Sensor
21 Vehicle Speed Sensor
22 Accelerator Opening Degree Sensor
23 Receiving Device
50 ECU
100 Hybrid Vehicle
MG1 First Motor Generator
MG2 Second Motor Generator

The invention claimed is:

1. A control apparatus for a vehicle having a prime mover, which is applied to a vehicle comprising an internal combustion engine, a prime mover and an air conditioning mechanism which performs air conditioning by using cooling water of the internal combustion engine, the control apparatus comprising:
    an engine stop permitting unit which permits stopping the internal combustion engine based on a requested load of the internal combustion engine, when a temperature of the cooling water becomes equal to or higher than an engine stop permitting water temperature;
    an engine activating unit which activates the internal combustion engine when the temperature of the cooling water becomes lower than an engine activation requesting water temperature, which is set to be lower than the engine stop permitting water temperature; and
    a correcting unit which corrects the engine stop permitting water temperature used by the engine stop permitting unit to be higher at a first vehicle speed than the engine stop permitting water temperature at a second vehicle speed, the first vehicle speed being higher than the second vehicle speed.

2. The control apparatus for a vehicle having a prime mover according to claim 1, wherein the correcting unit obtains an accelerator opening degree corresponding to a driving power request by a driver, and corrects the engine stop permitting water temperature to be higher at a first accelerator opening degree than the engine stop permitting water temperature at a second accelerator opening degree, the first accelerator opening degree being higher than the second accelerator opening degree.

3. The control apparatus for a vehicle having a prime mover according to claim 1, further comprising a low vehicle speed predicting unit which predicts that the vehicle will be driven at a low vehicle speed, and
    wherein the correcting unit corrects the engine stop permitting water temperature to be high when the low vehicle speed predicting unit predicts that the vehicle will be driven at the low vehicle speed.

4. The control apparatus for a vehicle having a prime mover according to claim 3,
    wherein the low vehicle speed predicting unit predicts that the vehicle will be stopped and predicts a vehicle stopping time, and
    wherein the correcting unit corrects the engine stop permitting water temperature to be higher at a first vehicle stopping time predicted by the low vehicle speed predicting unit than the engine stop permitting water temperature at a second vehicle stopping time predicted by the low vehicle speed predicting unit, the first vehicle stopping time being longer than the second vehicle stopping time.

* * * * *